United States Patent
Shimizu

(10) Patent No.: US 11,920,108 B2
(45) Date of Patent: Mar. 5, 2024

(54) ANTIREDEPOSITION AGENT AND DETERGENT COMPOSITION

(71) Applicant: MITSUI CHEMICALS, INC., Tokyo (JP)

(72) Inventor: Akinori Shimizu, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 772 days.

(21) Appl. No.: 17/041,466

(22) PCT Filed: Mar. 29, 2019

(86) PCT No.: PCT/JP2019/014206
§ 371 (c)(1),
(2) Date: Sep. 25, 2020

(87) PCT Pub. No.: WO2019/189837
PCT Pub. Date: Oct. 3, 2019

(65) Prior Publication Data
US 2021/0130740 A1    May 6, 2021

(30) Foreign Application Priority Data

Mar. 30, 2018 (JP) ................. 2018-067483

(51) Int. Cl.
| C11D 1/10 | (2006.01) |
| C11D 3/00 | (2006.01) |
| C11D 3/37 | (2006.01) |
| C11D 7/32 | (2006.01) |
| C11D 11/00 | (2006.01) |
| D06L 1/12 | (2006.01) |

(52) U.S. Cl.
CPC .......... C11D 3/3719 (2013.01); C11D 3/0036 (2013.01); C11D 11/0017 (2013.01); D06L 1/12 (2013.01)

(58) Field of Classification Search
None
See application file for complete search history.

(56) References Cited

U.S. PATENT DOCUMENTS

| 5,466,779 A * | 11/1995 | Ross ................. C08G 73/1092 |
| | | 528/367 |
| 5,543,490 A | 8/1996 | Groth et al. |
| 5,552,516 A | 9/1996 | Ross et al. |
| 5,595,681 A | 1/1997 | Panandiker et al. |
| 5,616,547 A | 4/1997 | Ponce et al. |
| 5,643,863 A * | 7/1997 | Guerin .................... C11D 3/10 |
| | | 510/475 |
| 2016/0229956 A1 | 8/2016 | Detering et al. |
| 2017/0321008 A1* | 11/2017 | Tuerkoglu ......... C08G 73/1092 |
| 2018/0251709 A1* | 9/2018 | Tuerkoglu ............. C08G 69/04 |

FOREIGN PATENT DOCUMENTS

| EP | 0747417 A1 | 12/1996 |
| JP | H05148495 A | 6/1993 |
| JP | H0711295 A | 1/1995 |
| JP | H0987680 A | 3/1997 |
| JP | H10502108 A | 2/1998 |
| JP | 2016532763 A | 10/2016 |
| WO | 95/35337 A1 | 12/1995 |

OTHER PUBLICATIONS

International Search Report (PCT/ISA/210) dated May 7, 2019, by the Japan Patent Office as the International Searching Authority for International Application No. PCT/JP2019/014206.
Written Opinion (PCT/ISA/237) dated May 7, 2019, by the Japan Patent Office as the International Searching Authority for International Application No. PCT/JP2019/014206.

* cited by examiner

*Primary Examiner* — Lorna M Douyon
(74) *Attorney, Agent, or Firm* — BUCHANAN, INGERSOLL & ROONEY PC

(57) ABSTRACT

An antiredeposition agent includes a polyaspartic acid alkali metal having a polydispersity, represented by the ratio (Mw/Mn) of the weight-average molecular weight (Mw) to the number-average molecular weight (Mn), of 1.4 or more and being selected from the group consisting of lithium polyaspartate, potassium polyaspartate, and sodium polyaspartate.

20 Claims, 1 Drawing Sheet

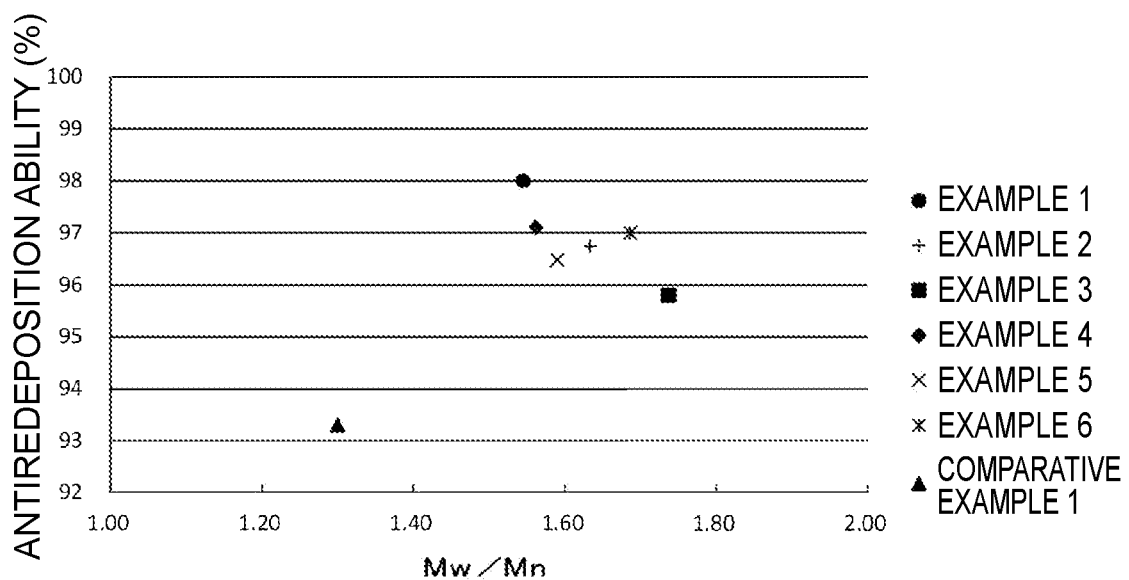

ANTIREDEPOSITION AGENT AND DETERGENT COMPOSITION

TECHNICAL FIELD

The present disclosure relates to an antiredeposition agent and a detergent composition.

BACKGROUND ART

Builders are optional components that improve the performance of surfactants in detergents, and each builder has one or more functions of, for example, an alkali buffering action, a dispersing action, or a metal chelating action. Formerly, sodium tripolyphosphate was widely used as such a detergent builder; however, since a phosphate in waste water places a load on the environment, sodium tripolyphosphate has been replaced with, for example, zeolite A.

Japanese Patent Application Laid-Open (JP-A) No. H5-148495 describes, as a technology associated with a builder, a detergent composition including a polyimide biopolymer that is obtained by polycondensation of aspartic or glutamic acid or a precursor of such an acid, and that has a COO$^-$ charge of from 0 mol to $5\times10^{-4}$ mol per gram of polymer and that can be provided with a COO$^-$ charge density of at least $10^{-3}$ mol per gram of polymer in a washing tub. JP-A No. H7-11295 describes a detergent composition that includes a polyaspartate salt having a weight-average molecular weight of from 5,000 to 100,000 and having a β-isomer content of 50% or more. JP-A No. H9-87680 describes a builder including: (a) a polycarboxylic acid and/or a salt thereof which has a molecular weight of 1,000 or more and a biodegradability of 50% or more; and (b) a polycarboxylic acid and/or a salt thereof which has a molecular weight of 600 or less and a calcium ion stability constant pKca of 3.5 or more.

CITATION LIST

Patent Document

[Patent Document 1] JP-A No. H5-148495
[Patent Document 2] JP-A No. H7-11295
[Patent Document 3] JP-A No. H9-87680

SUMMARY OF INVENTION

Technical Problem

An antiredeposition ability, which is one function related to a builder, is the ability to prevent dirt that has once been removed by washing from an item being washed, from being redeposited on the item being washed. Conventionally, polyalkylene glycol-based substances or cellulose-based substances have been used as antiredeposition agents.

JP-A No. H5-148495 describes provision of a detergent composition that includes a polyimide biopolymer capable of forming a biodegradable polypeptide builder. JP-A No. H7-11295 describes use of a polyaspartate salt having a β body content of 50% or more as a builder, and the detergency of a detergent composition including the polyaspartate salt is measured. However, JP-A No. H7-11295 neither describes the antiredeposition ability of the polyaspartate salt nor focuses attention on the ratio between the weight-average molecular weight of the polyaspartate salt and the number-average molecular weight of the polyaspartate salt. JP-A No. H9-87680 describes a detergent builder including (a) a polycarboxylic acid and/or a salt thereof which has a molecular weight of 1,000 or more and a biodegradability of 50% or more, and (b) a polycarboxylic acid and/or a salt thereof which has a molecular weight of 600 or less and a calcium ion stability constant pKca of 3.5 or more, and JP-A No. H9-87680 describes polyaspartic acid as one example of the polycarboxylic acid and/or a salt thereof which has a molecular weight of 1,000 or more and a biodegradability of 50% or more. However, JP-A No. H9-87680 neither describes the antiredeposition ability of a polyaspartate salt alone, which is not necessarily combined with the component (b) described above, nor focuses attention on the ratio between the weight-average molecular weight of the polyaspartate salt and the number-average molecular weight of the polyaspartate salt.

As a result of diligent study, the present inventors have found that a polyaspartic acid alkali metal salt having a ratio (Mw/Mn, hereinafter also referred to as "polydispersity") of its weight-average molecular weight (Mw) to its number-average molecular weight (Mn) that is within a specific range and being selected from the group consisting of lithium polyaspartate, potassium polyaspartate, and sodium polyaspartate has a favorable antiredeposition ability. Based on this finding, an object of one embodiment of the present invention is to provide a novel antiredeposition agent and a novel detergent composition that have excellent antiredeposition ability.

Solution to Problem

The present disclosure includes the following aspects:

<1> A detergent composition, including an antiredeposition agent,
the antiredeposition agent including a polyaspartic acid alkali metal salt having a polydispersity, represented by the ratio (Mw/Mn) of the weight-average molecular weight (Mw) to the number-average molecular weight (Mn), of 1.4 or more and being selected from the group consisting of lithium polyaspartate, potassium polyaspartate, and sodium polyaspartate.

<2> The detergent composition according to <1>, wherein the detergent composition has a pH from 6 to less than 9.

<3> The detergent composition according to <1> or <2>, wherein the polyaspartic acid alkali metal salt includes sodium polyaspartate, potassium polyaspartate, or both of sodium polyaspartate and potassium polyaspartate.

<4> The detergent composition according to any one of <1> to <3>, wherein the polyaspartic acid alkali metal salt has a polydispersity of from 1.4 to less than 2.1.

<5> The detergent composition according to any one of <1> to <4>, wherein the polyaspartic acid alkali metal salt has a polydispersity of from 1.4 to 1.9.

<6> The detergent composition according to any one of <1> to <5>, wherein the polyaspartic acid alkali metal salt has a weight-average molecular weight (Mw) of from 1000 to 120000.

<7> The detergent composition according to any one of <1> to <6>, wherein the polyaspartic acid alkali metal salt has a weight-average molecular weight (Mw) of from 4000 to 80000.

<8> The detergent composition according to any one of <1> to <7>, wherein the polyaspartic acid alkali metal salt has a number-average molecular weight (Mn) of from 1000 to 80000.

<9> The detergent composition according to any one of <1> to <8>, wherein the polyaspartic acid alkali metal salt has a number-average molecular weight (Mn) of from 4000 to 50000.

<10> The detergent composition according to any one of <1> to <9>, wherein the polyaspartic acid alkali metal salt is a solid phase polymerization polyaspartic acid alkali metal salt.

<11> The detergent composition according to any one of <1> to <10>, further including a surfactant.

<12> The detergent composition according to any one of <1> to <11>, wherein the detergent composition is a detergent composition for clothing.

<13> An antiredeposition agent including a polyaspartic acid alkali metal salt having a polydispersity, represented by the ratio (Mw/Mn) of the weight-average molecular weight (Mw) to the number-average molecular weight (Mn), of 1.4 or more and being selected from the group consisting of lithium polyaspartate, potassium polyaspartate, and sodium polyaspartate.

<14> The antiredeposition agent according to <13>, wherein the antiredeposition agent is used in a detergent composition having a pH from 6 to less than 9.

<15> The antiredeposition agent according to <13> or <14>, wherein the polyaspartic acid alkali metal salt includes sodium polyaspartate, potassium polyaspartate, or both of sodium polyaspartate and potassium polyaspartate.

<16> The antiredeposition agent according to any one of <13> to <15>, wherein the polyaspartic acid alkali metal salt has a polydispersity of from 1.4 to less than 2.1.

<17> The antiredeposition agent according to any one of <13> to <16>, wherein the polyaspartic acid alkali metal salt has a polydispersity of from 1.4 to 1.9.

<18> The antiredeposition agent according to any one of <13> to <17>, wherein the polyaspartic acid alkali metal salt has a weight-average molecular weight (Mw) of from 1000 to 120000.

<19> The antiredeposition agent according to any one of <13> to <18>, wherein the polyaspartic acid alkali metal salt has a weight-average molecular weight (Mw) of from 4000 to 80000.

<20> The antiredeposition agent according to any one of <13> to <19>, wherein the polyaspartic acid alkali metal salt has a number-average molecular weight (Mn) of from 1000 to 80000.

<21> The antiredeposition agent according to any one of <13> to <20>, wherein the polyaspartic acid alkali metal salt has a number-average molecular weight (Mn) of from 4000 to 50000.

<22> The antiredeposition agent according to any one of <13> to <21>, wherein the polyaspartic acid alkali metal salt is a solid phase polymerization polyaspartic acid alkali metal salt.

<23> The antiredeposition agent according to any one of <13> to <22>, wherein the antiredeposition agent is used in a detergent composition for clothing, the detergent composition having a pH from 6 to less than 9.

<24> A detergent composition including a surfactant and the antiredeposition agent according to any one of <13> to <23>.

<25> Use of a polyaspartic acid alkali metal salt for reducing redeposition of dirt during washing, the polyaspartic acid alkali metal salt having a polydispersity, represented by the ratio (Mw/Mn) of the weight-average molecular weight (Mw) to the number-average molecular weight (Mn), of 1.4 or more and being selected from the group consisting of lithium polyaspartate, potassium polyaspartate, and sodium polyaspartate.

<26> The use according to <25>, wherein the polyaspartic acid alkali metal salt is used in a detergent composition having a pH from 6 to less than 9.

<27> The use according to <25> or <26>, wherein the polyaspartic acid alkali metal salt includes sodium polyaspartate, potassium polyaspartate, or both of sodium polyaspartate and potassium polyaspartate.

<28> The use according to any one of <25> to <27>, wherein the polyaspartic acid alkali metal salt has a polydispersity of from 1.4 to less than 2.1.

<29> The use according to any one of <25> to <28>, wherein the polyaspartic acid alkali metal salt has a polydispersity of from 1.4 to 1.9.

<30> The use according to any one of <25> to <29>, wherein the polyaspartic acid alkali metal salt has a weight-average molecular weight (Mw) of from 1000 to 120000.

<31> The use according to any one of <25> to <30>, wherein the polyaspartic acid alkali metal salt has a weight-average molecular weight (Mw) of from 4000 to 80000.

<32> The use according to any one of <25> to <31>, wherein the polyaspartic acid alkali metal salt has a number-average molecular weight (Mn) of from 1000 to 80000.

<33> The use according to any one of <25> to <32>, wherein the polyaspartic acid alkali metal salt has a number-average molecular weight (Mn) of from 4000 to 50000.

<34> The use according to any one of <25> to <33>, wherein the polyaspartic acid alkali metal salt is a solid phase polymerization polyaspartic acid alkali metal salt.

<35> The use according to any one of <25> to <34>, which is use in a detergent composition for clothing, the detergent composition having a pH from 6 to less than 9.

<36> The use according to <26> or <35>, wherein the detergent composition includes a surfactant.

<37> A method of applying an antiredeposition ability to a detergent composition, the method including incorporating, into the detergent composition, a polyaspartic acid alkali metal salt having a polydispersity, represented by the ratio (Mw/Mn) of the weight-average molecular weight (Mw) to the number-average molecular weight (Mn), of 1.4 or more and being selected from the group consisting of lithium polyaspartate, potassium polyaspartate, and sodium polyaspartate.

<38> The method according to <37>, wherein the detergent composition has a pH from 6 to less than 9.

<39> The method according to <37> or <38>, wherein the polyaspartic acid alkali metal salt is sodium polyaspartate, potassium polyaspartate, or both of sodium polyaspartate and potassium polyaspartate.

<40> The method according to any one of <37> to <39>, wherein the polyaspartic acid alkali metal salt has a polydispersity of from 1.4 to less than 2.1.

<41> The method according to any one of <37> to <40>, wherein the polyaspartic acid alkali metal salt has a polydispersity of from 1.4 to 1.9.

<42> The method according to any one of <37> to <41>, wherein the polyaspartic acid alkali metal salt has a weight-average molecular weight (Mw) of from 1000 to 120000.

<43> The method according to any one of <37> to <42>, wherein the polyaspartic acid alkali metal salt has a weight-average molecular weight (Mw) of from 4000 to 80000.

<44> The method according to any one of <37> to <43>, wherein the polyaspartic acid alkali metal salt has a number-average molecular weight (Mn) of from 1000 to 80000.

<45> The method according to any one of <37> to <44>, wherein the polyaspartic acid alkali metal salt has a number-average molecular weight (Mn) of from 4000 to 50000.

<46> The method according to any one of <37> to <45>, wherein the polyaspartic acid alkali metal salt is a solid phase polymerization polyaspartic acid alkali metal salt.

<47> The method according to any one of <37> to <46>, wherein the detergent composition is a detergent composition for clothing, the detergent composition having a pH from 6 to less than 9.

<48> The method according to any one of <37> to <47>, wherein the detergent composition includes a surfactant.

Advantageous Effects of Invention

According to the present disclosure, a novel antiredeposition agent and a novel detergent composition that have excellent antiredeposition ability can be provided.

BRIEF DESCRIPTION OF DRAWINGS

FIG. 1 is a graph indicating the relationship between the polydispersity (weight-average molecular weight (Mw)/number-average molecular weight (Mn)) of sodium polyaspartate and the potassium polyaspartate and the antiredeposition ability thereof.

DESCRIPTION OF EMBODIMENTS

The specifics of the present disclosure will be described in detail below. Although explanation of constituent elements provided below may be made based on typical embodiments of the present disclosure. The present disclosure is not limited to such embodiments.

In a series of numerical ranges described in the present disclosure, the upper or lower limit value of one numerical range may be replaced by the upper or lower limit value of another numerical range in the series of numerical ranges. The upper or lower limit value of a numerical range described in the present disclosure may be replaced by a value described in working examples.

In a case in which plural substances corresponding to a component of interest are present in a composition, the amount of the component in the composition described in the present disclosure means the total amount of the plural substances present in the composition, unless otherwise specified.

In the present disclosure, a numerical range expressed using "to" refers to a range that includes the values indicated before and after "to" as the minimum and maximum values, respectively.

In the present specification, description of a group (atomic group) that is not specified to be substituted or unsubstituted encompasses groups having a substituent, as well as groups having no substituent.

The term "step" as used herein encompasses not only an independent step, but also a step that cannot be clearly distinguished from another step as long as the intended object of the step is achieved.

In the present disclosure, "% by mass" and "% by weight" are synonymous with each other, and "part(s) by mass" and "part(s) by weight" are synonymous with each other. In the present disclosure, "%" when used to indicate the amount of a contained component is based on mass, unless otherwise specified.

In the present disclosure, a combination of two or more preferred aspects is a more preferred aspect.

<Antiredeposition Agent>

An antiredeposition agent according to the present disclosure is an antiredeposition agent (hereinafter also referred to as "antiredeposition agent according to the present disclosure") including a polyaspartic acid alkali metal salt (hereinafter also referred to as "polyaspartic acid alkali metal salt according to the present disclosure") having a polydispersity, represented by a ratio (Mw/Mn) of a weight-average molecular weight (Mw) to a number-average molecular weight (Mn), of 1.4 or more and being selected from the group consisting of lithium polyaspartate, potassium polyaspartate, and sodium polyaspartate.

An antiredeposition agent refers to a substance that reduces redeposition of dirt, which has once been removed by washing from an item being washed, on the item being washed. The "antiredeposition agent" according to the present disclosure may be an agent carrying another name as long as the agent is used in the foregoing application, and represents a concept that encompasses substances expressed by names such as anti-soil redeposition agents, dispersants, or migration proofing agents. Conventionally, polyalkylene glycol-based substances or cellulose-based substances have been commonly used as antiredeposition agents. In the present disclosure, a high antiredeposition effect can be achieved by using a polyaspartic acid alkali metal salt having a polydispersity (Mw/Mn) of 1.4 or more. The polyaspartic acid alkali metal salt is preferably sodium polyaspartate, potassium polyaspartate, or both of sodium polyaspartate and potassium polyaspartate.

(Method of Measuring pH)

In the present disclosure, the pH of the detergent composition means a pH measured in the following manner. First, an aqueous solution containing 0.1% by mass of a detergent composition (which may be solid or liquid) to be measured is prepared. The aqueous solution is obtained by dissolving or diluting the detergent composition in pure water so as to have a final concentration of 0.1% by mass.

The pH electrode (model 9680) of a pH meter D-52 manufactured by HORIBA, Ltd. is calibrated with a phthalate buffer (pH 4.01), a phosphoric acid standard solution (pH 6.86), and a borate standard solution (pH 9.18) and sufficiently rinsed with ion-exchanged water in advance. The pH electrode, which has been calibrated and washed as described above, is placed in the above aqueous solution having a temperature adjusted to 30° C., and measurement is performed using the AUTO HOLD mode of the pH meter, until the measurement value becomes constant. In the present disclosure, the pH of the detergent composition means the pH of the aqueous solution containing the detergent composition measured at 30° C.

(Method of Measuring Redeposition Prevention Ratio)

The antiredeposition ability can be evaluated by measuring a redeposition prevention ratio in the following manner.

The reflectance of a surface of a stack of five 2.5 cm×2.5 cm white cotton cloths (WFK10A (manufactured by WFK)) was measured for each of the cloths, and the average value of the surface reflectances of the five white cotton cloths was calculated. A spectral color-difference meter (SE-7700 (manufactured by NIPPON DENSHOKU INDUSTRIES CO., LTD.), light source: C/2 (light source C, visual field: 2°), wavelength: 500 nm, measuring aperture of 10 mm in diameter) was used for the measurement. After the measurement of the surface reflectances of the cotton cloths prior to washing, detergent compositions for a test (substances other than calcium chloride and iron oxide among components set forth in Table 1), iron oxide for coloration (TODA COLOR 100ED (manufactured by TODA KOGYO CORP., BET average particle diameter: 0.10 μm)) as a mud soil model, and calcium chloride for adjusting hardness were added to purified water, to produce 200 mL of dispersion liquid having the composition set forth in Table 1. Among the components of the dispersion liquid, calcium ion is a component that is generally included in water and imparts hardness to water. The detergent composition can be adjusted to any desired pH by adding an appropriate acid or alkali to the detergent composition, as appropriate.

TABLE 1

| Blended Component | Weight (%) in Total Solid | Concentration (ppm) in Test Liquid |
|---|---|---|
| Sodium dodecyl sulfate | 27.5 | 253.5 |
| Polyethylene glycol | 1.1 | 10.0 |
| Sodium carbonate | 7.2 | 66.5 |
| Sodium metasilicate | 5.0 | 46.5 |
| Potassium carbonate | 2.2 | 20.0 |
| Sodium sulfate | 1.5 | 13.5 |
| Sodium sulfite | 0.3 | 2.5 |
| Zeolite | 18.1 | 167.0 |
| Polyaspartic acid alkali metal salt to be tested | 0.4 | 3.4 |
| Calcium chloride | 15.0 | 138.7 (50 in terms of $Ca^{2+}$) |
| Iron oxide | 21.7 | 200.0 |

Then, the cotton cloths were added into the dispersion liquid, stirred at 30° C. for 30 minutes, and subjected twice to rinsing with 50 ppm $Ca^{2+}$ aqueous solution (138.7 ppm $CaCl_2$ aqueous solution) for 3 minutes under stirring. The obtained cotton cloths were dried at 60° C. for 1 hour, and wrinkles were smoothened out with a flat-iron. Then, the reflectances of the surfaces of the respective (five) cotton cloths were measured, and the average value of the reflectances was obtained. The redeposition prevention ratio was calculated from the average values of the reflectances of the surfaces of the cotton cloths before and after the washing with the test liquid, according to the following Formula.

Redeposition prevention ratio (%)=(average value of reflectances of surfaces of cotton cloths after washing/average value of reflectances of cotton cloths before washing)×100%

(Polydispersity)

The polydispersity (weight-average molecular weight (Mw)/number-average molecular weight (Mn)) of the molecular weight of the polyaspartic acid alkali metal salt according to the present disclosure is 1.4 or more. The antiredeposition ability can be improved by setting the polydispersity to a value in this range. The polydispersity of the molecular weight of the polyaspartic acid alkali metal salt is more preferably 1.45 or more, and still more preferably 1.5 or more. The polydispersity is preferably 1.9 or less, and more preferably 1.7 or less. Therefore, it is preferable that the polydispersity of the molecular weight of the polyaspartic acid alkali metal salt is, for example, from 1.4 to 1.9. The polydispersity may be, for example, a value of 1.65 or less, or may be, for example, a value of 1.55 or more. The numerical range of the polydispersity can be made by freely selecting and combining a lower limit value and an upper limit value from among the lower and upper limit values of the polydispersity described above.

(Method of Measuring Molecular Weight)

In the present disclosure, each of the weight-average molecular weight (Mw), number-average molecular weight (Mn), and polydispersity (Mw/Mn) of the polyaspartic acid alkali metal salt refers to a value obtained by measurement according to the following GPC measurement method using gel permeation chromatography (GPC).

An LC-SOLUTION (manufactured by SHIMADZU CORPORATION) as an analysis apparatus,
an RID-10A (manufactured by SHIMADZU CORPORATION) as a detector,
a DGU-20A (manufactured by SHIMADZU CORPORATION) as a degasser,
an LC-20AD (manufactured by SHIMADZU CORPORATION) as a pump,
an SIL-20A (manufactured by SHIMADZU CORPORATION) as an auto-sampler,
a CTO-20A (manufactured by SHIMADZU CORPORATION) as a liquid-feeding unit,
a SHODEX ASAHIPAK GF-7M HQ×1 (manufactured by Showa Denko K.K.) as a column, and
a SHODEX ASAHIPAK GF-1G7B (manufactured by Showa Denko K.K.) as a guard column
were used. The temperature of a column oven was set to 45° C. Standard samples were pullulan (SHODEX STANDARD P-82 (standard sample group kit manufactured by Showa Denko K.K.)). Among them, P-5, P-10, P-20, P-50, P-100, and P-200 were used to generate cubic-equation calibration curves. As a mobile phase, 0.1 mol/L of saline solution was used. In the obtained elution curves, Mw and Mn were calculated from the main peak of the polymer.

(Method of Producing Polyaspartic Acid Alkali Metal Salt)

The polyaspartic acid alkali metal salt may be obtained, for example, by a method including: heating aspartic acid to a range of from 200° C. to 230° C. in a water-insoluble solvent to obtain polysuccinimide; and hydrolyzing the obtained polysuccinimide in an alkali aqueous solution containing an alkali metal to produce a polyaspartic acid alkali metal salt, as described in Japanese Patent (JP-B) No. 3384420. A solvent that cause separation into layers when mixed with water, and that has a boiling point of 200° C. or more can be used as the water-insoluble solvent. For example, among saturated hydrocarbon compounds such as n-paraffin and liquid paraffin, silicone-based oils, fluorine-based oils, and the like, a solvent having a boiling point of 200° C. or more, and preferably 230° C. or more, and having a viscosity of 100 cP or less, and preferably 20 cP is or less, at 25° C. can be used. For example, sodium hydroxide, potassium hydroxide, and lithium hydroxide can be used as the alkali aqueous solution containing an alkali metal.

The polysuccinimide as a precursor can also be obtained by heating maleamidic acid at a temperature of from 160° C. to 330° C. The polysuccinimide can also be obtained by allowing maleic anhydride to react with aqueous ammonia in a water medium, followed by heating the resultant to a temperature of at least 170° C. Alternatively, the polyaspartic acid alkali metal salt can also be produced by a method including: performing polymerization using, as a monomer, at least one selected from a reactant of maleic anhydride and ammonia, or maleamic acid, to prepare a polyaspartic acid precursor polymer; and treating the obtained polyaspartic acid precursor polymer with an alkali hydroxide metal salt aqueous solution to obtain a polyaspartic acid alkali metal salt, as described in International Publication (WO) No. 2011/102293. These methods can be used by setting the conditions so as to achieve a polydispersity of 1.4 or more.

More specifically, the polyaspartic acid alkali metal salt according to the present disclosure can be obtained by the following method. Specifically, a method A of producing the polyaspartic acid alkali metal salt includes:

spreading L-aspartic acid on a vat made of SUS, and leaving the vat to stand in an oven at 230° C. for 4 hours in nitrogen atmosphere under ordinary pressure to obtain powdery polysuccinimide;

adding distilled water to the obtained powdery polysuccinimide, and dropwise adding an aqueous sodium hydroxide solution or aqueous potassium hydroxide solution in small amounts while regulating the temperature of the solution within a range of from 45° C. to 55° C.;

starting measurement of a pH when the reaction mass acquires flowability, and dropwise adding an aqueous sodium hydroxide solution or an aqueous potassium hydroxide solution while measuring the pH; and ending the dropwise addition when the pH ceases to fluctuate in a pH range of from 10 to 10.5.

In the present disclosure, "%" used for indicating the concentration of a solution means "% by mass".

A method B of producing the polyaspartic acid alkali metal salt includes:

charging L-aspartic acid, sulfolane, xylene, and 35% hydrochloric acid in a 2 L flask, and mixing these ingredients under stirring in nitrogen atmosphere under ordinary pressure at room temperature;

heating the resultant mixture at 113° C. for 3 hours, thereby causing salt formation;

further subjecting the formed salt to azeotropic dehydration and condensation at from 117° C. to 168° C. for 47 hours to obtain a solid reaction mixture;

allowing the obtained solid reaction mixture to cool to 80° C., and performing crystallizing and washing using acetonitrile;

thereafter collecting a suspended substance by filtration, and drying the suspended substance overnight under reduced pressure at 70° C. and 5 mmHg, to obtain powdery polysuccinimide;

adding distilled water to the obtained polysuccinimide, and dropwise adding an aqueous sodium hydroxide solution or aqueous potassium hydroxide solution in small amounts while regulating the temperature of the solution within a range of from 45° C. to 55° C.;

starting measurement of a pH when the reaction mass acquires flowability, and dropwise adding an aqueous sodium hydroxide solution or an aqueous potassium hydroxide solution while measuring the pH; and ending the dropwise addition when the pH ceases to fluctuate in a pH range of from 10 to 10.5.

In the descriptions of the method A of producing the polyaspartic acid alkali metal salt, the method B of producing the polyaspartic acid alkali metal salt, and Examples described later, it is described that the polyaspartic acid alkali metal salt is finally obtained in a pH range of from 10 to 10.5. However, the end point pH is not limited to a range of from 10 to 10.5, and any desired pH can be set at an end point as long as the pH is in an alkaline pH range, which is weakly alkaline or stronger. Then, the pH of the obtained aqueous solution of the polyaspartic acid alkali metal salt may optionally be changed within the alkaline pH range, which is weakly alkaline or stronger. In other words, the pH of the aqueous solution of the polyaspartic acid alkali metal salt may be within the alkaline pH range, which is weakly alkaline or more strongly alkaline.

In the methods described above, an aqueous sodium hydroxide solution, an aqueous potassium hydroxide solution, and an aqueous lithium hydroxide solution, for example, can be used as the alkali aqueous solution containing an alkali metal. Use of the aqueous sodium hydroxide solution enables sodium polyaspartate to be obtained, use of the aqueous potassium hydroxide solution enables potassium polyaspartate to be obtained, and use of the aqueous lithium hydroxide solution enables lithium polyaspartate to be obtained. The polyaspartic acid alkali metal salt according to the present disclosure can be obtained using, for example, production method A or the production method B. It will be appreciated that methods that can be used for producing the polyaspartic acid alkali metal salt according to the present disclosure are not limited to the above methods.

In a case in which the polyaspartic acid alkali metal salt is obtained by hydrolyzing polysuccinimide, succinimide structural units that have not been hydrolyzed may partly remain in a polymer. In other words, the polyaspartic acid alkali metal salt according to the present disclosure may partly (for example, 10% or less, 5% or less, or 1% or less of the total number of constitutional units) contain succinimide structural units, or may contain no succinimide structural units.

The polyaspartic acid alkali metal salt according to the present disclosure is preferably a solid phase polymerization polyaspartic acid alkali metal salt. For example, reference to JP-A No. 2000-239379 or JP-A No. 2000-239380 can be made concerning solid phase polymerization for obtaining the polyaspartic acid alkali metal salt. There is a tendency that the solid phase polymerization polyaspartic acid alkali metal salt has a different feature, in terms of molecular weight, from that of polyaspartic acid alkali metal salts obtained by other polymerization processes such as melt polymerization.

In the antiredeposition agent according to the present disclosure, the weight-average molecular weight (Mw) of the polyaspartic acid alkali metal salt is not particularly limited. A weight-average molecular weight preferred from the viewpoint of wrapping dirt and reducing aggregation of wrapped dirt particles is, for example, from 1000 to 120000. The weight-average molecular weight (Mw) of the polyaspartic acid alkali metal salt may be from 4000 to 80000, may be from 8000 to 60000, may be from 12000 to 40000, may be from 16000 to 35000, or may be from 20000 to 27000.

In the antiredeposition agent according to the present disclosure, the number-average molecular weight (Mn) of the polyaspartic acid alkali metal salt is not particularly limited, and is, for example, from 1000 to 80000. The number-average molecular weight (Mn) of the polyaspartic acid alkali metal salt may be from 4000 to 50000, may be from 7000 to 30000, may be from 12000 to 20000, or may be from 13000 to 16000.

For example, in the production method B, the polydispersity of the polyaspartic acid alkali metal salt can be controlled, as desired, based on the addition amount of 35% hydrochloric acid, which is an acid catalyst for the production of polysuccinimide. The polydispersity is decreased by decreasing the addition amount of 35% hydrochloric acid, and the polydispersity is increased by increasing the addition amount of 35% hydrochloric acid.

The polyaspartic acid alkali metal salt having a weight-average molecular weight (Mw), a number-average molecular weight (Mn), and a polydispersity of molecular weight in the aforementioned ranges can be obtained by appropriately using, for example, the above-described method of producing the polyaspartic acid alkali metal salt.

(Antiredeposition Ability)

The redeposition prevention ratio of the polyaspartic acid alkali metal salt according to the present disclosure is preferably 94% or more, still more preferably 95% or more, and even more preferably 96% or more.

<Detergent Composition>

The detergent composition according to the present disclosure is a detergent composition including a surfactant and the antiredeposition agent according to the present disclosure. The detergent composition includes the antiredeposition agent according to the present disclosure as well as the surfactant, whereby the detergent composition enables effective reduction in redeposition of dirt as well as exhibiting a washing power when the detergent composition is used in washing.

The detergent composition according to the present disclosure may be in the form of a powder composition configured to be dissolved in a solvent such as water before use, or may be in the form of a concentrated liquid composition configured to be diluted with a solvent such as water before use, or may itself be a solution to be used for washing of an item to be washed.

The surfactant in the detergent composition is not particularly limited as long as the surfactant exhibits an interface activating activity in a solvent, such as water, to clean an item to be washed. The surfactant preferably has high biodegradability from the viewpoint of reducing an environmental load. Examples of anionic surfactants include linear alkyl benzene sulfonate (LAS), α-sulfo fatty acid methyl ester salt (MES), α-olefin sulfonate (AOS), a sodium salt of a long-chain mono-alkyl ester of sulfuric acid (for example, sodium dodecyl sulfate), and soap. Examples of nonionic surfactants include polyoxyethylene alkyl ether and polyoxyethylene alkyl phenyl ether. In addition, cationic surfactants and amphoteric surfactants that are used as surfactants in detergents in the relevant art can also be used.

The molecular weight of the surfactant may be 1000 or less, may be from 150 to 1000, or may be from 200 to 500.

The detergent composition may include various additional components as well as a surfactant and the antiredeposition agent according to the present disclosure. Examples of the additional components include: alkali agents such as sodium carbonate, sodium silicate, sodium metasilicate, and potassium carbonate; pH adjusters such as sodium citrate; water softening agents such as zeolite; metal chelating agents such as etidronic acid; stabilizers such as polyethylene glycol, butyl carbitol, and sodium sulfite; enzymes such as cellulase, protease, and lipase; fluorescent whitening agents such as umbelliferone; bleaching agents such as sodium sulfite, sodium percarbonate, and hydrogen peroxide; micelle formation enhancing agents such as sodium sulfate; and flavoring agents. In a case in which the detergent composition is a detergent composition for clothing, the detergent composition for clothing may include one or more selected from the group consisting of enzymes, bleaching agents such as sodium sulfite, and fluorescent whitening agents. The purpose of incorporating compounds mentioned above as additional components into the detergent composition is not limited to the purposes described above. Specifically, each substance can have plural functions, and, for example, even though sodium citrate is described as an example of a pH adjuster, sodium citrate may be used for other purposes (for example, as a metal chelating agent). Similarly, other substances are not limited with respect to the purpose of use thereof.

In the solid content of the detergent composition, from which solvents are excluded, the content of surfactant is, for example, from 10% by mass to 60% by mass, and the content of alkali agent is, for example, from 5% by mass to 40% by mass. In the solid content of the detergent composition, from which solvents are excluded, the content of the polyaspartic acid alkali metal salt according to the present disclosure may be from 0.01% by mass to 10% by mass, may be from 0.05% by mass to 1% by mass, or may be from 0.1% by mass to 0.8% by mass. The polyaspartic acid alkali metal salt according to the present disclosure can effectively exhibit the antiredeposition ability even at a low content such as the ranges described above.

In the solution used for the washing of the item to be washed (also referred to as a "washing liquid" in the present specification), the concentration of surfactant may be, for example, from 50 ppm to 1000 ppm, or from 100 ppm to 500 ppm, and the concentration of alkali agent may be, for example, from 20 ppm to 3000 ppm, or from 50 ppm to 2000 ppm. In the washing liquid, the concentration of the polyaspartic acid alkali metal salt according to the present disclosure (antiredeposition agent according to the present disclosure) is, for example, from 0.1 ppm to 50 ppm, from 0.5 ppm to 5 ppm, or from 0.5 ppm to 10 ppm, or may be from 1 ppm to 10 ppm. The polyaspartic acid alkali metal salt according to the present disclosure effectively exhibits the antiredeposition ability even at a low concentration such as the ranges described above. The washing liquid may be, for example, washing water obtained by dissolving or dispersing a washing composition in water, or washing liquid obtained by dissolving or dispersing a washing composition in a mixed solvent including a water-miscible organic solvent (for example, an alcohol such as ethanol) together with water.

The pH of the detergent composition according to the present disclosure is preferably from 6 to less than 9. As described above, the pH of the detergent composition means the pH of an aqueous solution containing 0.1% by mass of the detergent composition measured at 30° C. In general, it is thought that detergents having a pH value that is strongly alkaline (for example, pH 9.5 or more) have higher detergency, and detergents having such a high pH are used, for example, in dish washers. However, strongly alkaline detergents, for example, damage clothing when the detergents are used in washing of clothing, and roughen the skin of hands in a use condition in which the detergents contact the hands. In the case of using the antiredeposition agent according to the present disclosure, washing performance is improved by the antiredeposition ability of the antiredeposition agent even when the antiredeposition agent is used in a weakly acidic to weakly alkaline detergent such as a pH value of from 6 to less than 9. Therefore, an effect exerted by the antiredeposition agent is more significantly manifested when the antiredeposition agent according to the present disclosure is used in a detergent having a pH of from 6 to less than 9.

As illustrated by the above difference in pH, detergent compositions are designed to suit their respective applications. Therefore, simple diversion of a detergent composition for a specific washing use as-is to another washing use would generally fail to satisfy the practically required performance. The detergent composition according to the present disclosure can be appropriately designed in accordance with the use application thereof.

The pH of the detergent composition according to the present disclosure is preferably from 6 to less than 9, more preferably from 6.5 to 8.8, and still more preferably from 7.0 to 8.5.

According to the present disclosure, use of the polyaspartic acid alkali metal salt according to the present disclosure for reducing redeposition of dirt during washing can also be provided. In other words, use of the polyaspartic acid alkali metal salt according to the present disclosure as an antiredeposition agent is provided. The details of the polyaspartic acid alkali metal salt according to the present disclosure and the details of the detergent composition in which the polyaspartic acid alkali metal salt according to the present disclosure is used are as described above.

According to the present disclosure, a method of imparting antiredeposition ability to a detergent composition is also provided which includes incorporating the polyaspartic acid alkali metal salt according to the present disclosure into the detergent composition. In other words, a method of imparting antiredeposition ability to a detergent composition is provided which includes incorporating the polyaspartic acid alkali metal salt according to the present disclosure as an antiredeposition agent into the detergent composition. The details of the polyaspartic acid alkali metal salt according to the present disclosure and the details of the detergent composition into which the polyaspartic acid alkali metal salt according to the present disclosure has been incorporated are as described above. An item to be washed can be washed by optionally diluting the detergent composition with a solvent, such as water, to produce washing liquid, and washing the item to be washed, such as clothing, using the washing liquid. In the case of washing, techniques may be used, such as soaking an item to be washed in washing liquid, agitating washing liquid in which an item to be washed is soaked, or repeatedly pouring washing liquid over an item to be washed.

The detergent composition according to the present disclosure may be a detergent composition for clothing, a detergent composition for tableware, a detergent composition for washing machines, or a detergent composition for a house. The detergent composition according to the present disclosure is preferably a detergent composition for clothing, considering that the detergent composition exhibits excellent detergency due to the antiredeposition agent according to the present disclosure even in a range of from weak acidity to weak alkalinity, in which clothing material is not damaged.

In a case in which the antiredeposition agent or detergent composition according to the present disclosure is applied to washing of a textile product such as clothing, the material of the textile product is not particularly limited, and examples of the material include natural materials such as wool, silk, and cotton, chemical fibers such as polyester and polyamide, and combinations thereof. When the antiredeposition agent or detergent composition according to the present disclosure is applied to washing of textile products such as clothing, the antiredeposition agent or detergent composition according to the present disclosure exhibits excellent antiredeposition ability and excellent washing power for textile products in general, regardless of the kinds of the textile products.

The antiredeposition agent according to the present disclosure and the washing composition according to the present disclosure enables provision of excellent antiredeposition ability, as described above. The antiredeposition agent according to the present disclosure and the washing composition according to the present disclosure can be used in wide washing applications such as washing of clothing and washing of machines.

EXAMPLES

Embodiments will be further described with reference to the following examples. However, the present disclosure is not limited at all by the following Examples. In addition, "%" when used to indicate the amounts of components contained in compositions in examples is based on mass, unless otherwise specified.

Example 1: Preparation of Sodium Polyaspartate Having Mw/Mn Ratio of 1.55

On a vat made of SUS, 318.8 g of L-aspartic acid was spread, and the vat was left to stand in an oven at 230° C. for 4 hours in nitrogen atmosphere under ordinary pressure to obtain powdery polysuccinimide. The amount of the obtained polysuccinimide was 231.6 g. To the polysuccinimide, 162.1 g of distilled water was added, and an aqueous sodium hydroxide solution was dropwise added in small amounts while regulating the temperature of the solution within a range of from 45° C. to 55° C. Measurement of pH was started when the reaction mass gradually acquired flowability. Then, an aqueous sodium hydroxide solution was dropwise added while measuring the pH, and the dropwise addition was ended when the pH ceased to fluctuate in a pH range of from 10 to 10.5. As a result, an aqueous sodium polyaspartate solution which was homogeneous, brown, and transparent was obtained. The molecular weight of the obtained sodium polyaspartate was measured by GPC, and the sodium polyaspartate was found to have a weight-average molecular weight (Mw) of $2.23 \times 10^4$, a number-average molecular weight (Mn) of $1.44 \times 10^4$, and a polydispersity (Mw/Mn) of 1.55.

Example 2: Preparation of Potassium Polyaspartate Having Mw/Mn Ratio of 1.63

Potassium polyaspartate was obtained by replacing the aqueous sodium hydroxide solution used in the hydrolysis of the polysuccinimide in the method described in Example 1 by an aqueous potassium hydroxide solution having the same concentration. Specifically, 162.1 g of distilled water was added to 231.6 g of the powdery polysuccinimide that had been obtained in the same manner as that in Example 1, and an aqueous potassium hydroxide solution was dropwise added in small amounts while regulating the temperature of the solution within a range of from 45° C. to 55° C. Measurement of pH was started when the reaction mass gradually acquired flowability. Then, an aqueous potassium hydroxide solution was dropwise added while measuring the pH, and the dropwise addition was ended when the pH ceased to fluctuate in a pH range of from 10 to 10.5. As a result, an aqueous potassium polyaspartate solution which was homogeneous, brown, and transparent was obtained.

The molecular weight of the obtained potassium polyaspartate was measured by GPC, and the potassium polyaspartate was found to have a weight-average molecular weight (Mw) of $2.14 \times 10^4$, a number-average molecular weight (Mn) of $1.31 \times 10^4$, and a polydispersity (Mw/Mn) of 1.63.

Example 3: Preparation of Sodium Polyaspartate Having Mw/Mn Ratio of 1.74

In a 2 L flask, 236.0 g of L-aspartic acid, 472.0 g of sulfolane, 197.2 g of xylene, and 157.5 g of 35% hydrochloric acid were charged, and mixed, by stirring, in nitrogen atmosphere under ordinary pressure at room temperature. Then, the resultant mixture was heated at 113° C. for 3 hours to cause salt formation. The formed salt was further subjected to azeotropic dehydration and condensation at from 117° C. to 168° C. for 47 hours, to obtain a solid reaction mixture. The obtained solid reaction mixture was allowed to cool to 80° C., and crystallization and washing was performed using acetonitrile. Then, a suspended substance was collected by filtration, and dried overnight under reduced pressure at 70° C. and 5 mmHg, to obtain powdery polysuccinimide. The obtained polysuccinimide was in an amount of 171.4 g. To the polysuccinimide, 120.0 g of distilled water was added, and an aqueous sodium hydroxide solution was dropwise added in small amounts while regulating the temperature of the solution within a range of from 45° C. to 55° C. Measurement of pH was started when the reaction mass gradually acquired flowability. Then, an aqueous sodium hydroxide solution was dropwise added while measuring the pH, and the dropwise addition was ended when the pH ceased to fluctuate in a pH range of from 10 to 10.5. As a result, an aqueous sodium polyaspartate solution which was homogeneous, yellow, and transparent was obtained. The molecular weight of the obtained sodium polyaspartate was measured by GPC, and the sodium polyaspartate was found to have a weight-average molecular weight (Mw) of $7.87 \times 10^4$, a number-average molecular weight (Mn) of $4.53 \times 10^4$, and a polydispersity (Mw/Mn) of 1.74.

Example 4 to Example 6

Sodium polyaspartate in Example 4 to Example 6 was prepared by appropriately changing the conditions in the method described in Example 1.

The molecular weight of sodium polyaspartate in Example 4 was measured by GPC, and the sodium polyaspartate was found to have a weight-average molecular weight (Mw) of $1.72 \times 10^4$, a number-average molecular weight (Mn) of $1.10 \times 10^4$, and a polydispersity (Mw/Mn) of 1.56.

The molecular weight of sodium polyaspartate in Example 5 was measured by GPC, and the sodium polyaspartate was found to have a weight-average molecular weight (Mw) of $2.46 \times 10^4$, a number-average molecular weight (Mn) of $1.55 \times 10^4$, and a polydispersity (Mw/Mn) of 1.59.

The molecular weight of sodium polyaspartate in Example 6 was measured by GPC, and the sodium polyaspartate was found to have a weight-average molecular weight (Mw) of $4.90 \times 10^4$, a number-average molecular weight (Mn) of $2.90 \times 10^4$, and a polydispersity (Mw/Mn) of 1.69.

Comparative Example 1: Preparation of Sodium Polyaspartate Having Mw/Mn Ratio of 1.30

Sodium polyaspartate was obtained according to the method used in Example 1 described in in JP-B No. 3384420. The specifics thereof is as described below. Into a 1 L flask, 133.0 g of L-aspartic acid and 200 g of n-paraffin (H) were added. The resultant was allowed to react at 220° C. for 4 hours, and cooled to 50° C. Further, 286.0 g of 14% aqueous sodium hydroxide solution was added thereto, and stirred for 1 hour. The reaction mass was allowed to separate into a water layer and an organic layer, and the water layer was taken out. The obtained water layer was turbid due to residual n-paraffin. The water layer was treated by adding cerite and activated carbon to the water layer, as a result of which an aqueous sodium polyaspartate solution which was homogeneous, yellow, and transparent was obtained. The obtained sodium polyaspartate had a weight-average molecular weight (Mw) of $0.961 \times 10^4$, a number-average molecular weight (Mn) of $0.739 \times 10^4$, and a polydispersity (Mw/Mn) of 1.30.

In the Examples and Comparative Example described above, the measurement of molecular weight and polydispersities using GPC was performed using the method and apparatuses described in the section with the heading "Method of Measuring Molecular Weight" described above.

The redeposition prevention ratios of the sodium polyaspartates and potassium polyaspartate prepared in Example 1 to Example 6 and Comparative Example 1 were measured. The redeposition prevention ratios were measured by the method described in the section with the heading "Method of Measuring Redeposition Prevention Ratio" described above. The dispersion liquid (30° C.) used for measuring the redeposition prevention ratio had a pH of about 8 in each of the Examples and the Comparative Example. The results of the measurement of the redeposition prevention ratios are indicated in the following Table 2 and FIG. 1.

TABLE 2

|  | Mw/Mn | Redeposition Prevention Ratio (%) |
| --- | --- | --- |
| Example 1 | 1.55 | 98.0 |
| Example 2 | 1.63 | 96.7 |
| Example 3 | 1.74 | 95.8 |
| Example 4 | 1.56 | 97.1 |
| Example 5 | 1.59 | 96.5 |
| Example 6 | 1.69 | 97.0 |
| Comparative Example 1 | 1.30 | 93.3 |

As is clear from the results indicated in Table 2 and FIG. 1, it is found that an improved redeposition prevention ratio can be achieved by using the polyaspartic acid alkali metal salt according to the present disclosure having a polydispersity (Mw/Mn) of 1.4 or more.

The invention claimed is:

1. A detergent composition comprising an antiredeposition agent,
   the antiredeposition agent including a polyaspartic acid alkali metal salt having a polydispersity, represented by a ratio (Mw/Mn) of a weight-average molecular weight (Mw) to a number-average molecular weight (Mn), of 1.4 to 1.7 and being selected from the group consisting of lithium polyaspartate, potassium polyaspartate, and sodium polyaspartate, and
   the polyaspartic acid alkali metal salt having a weight-average molecular weight (Mw) of from 21,400 to 120,000.

2. The detergent composition according to claim 1, wherein the detergent composition has a pH from 6 to less than 9.

3. The detergent composition according to claim 1, wherein the polyaspartic acid alkali metal salt comprises sodium polyaspartate, potassium polyaspartate, or both of sodium polyaspartate and potassium polyaspartate.

4. The detergent composition according to claim 1, wherein the polyaspartic acid alkali metal salt has a polydispersity of from 1.4 to 1.69.

5. The detergent composition according to claim 1, wherein the polyaspartic acid alkali metal salt has a polydispersity of from 1.4 to 1.65.

6. The detergent composition according to claim 1, wherein the polyaspartic acid alkali metal salt is a solid phase polymerization polyaspartic acid alkali metal salt.

7. The detergent composition according to claim 1, further comprising a surfactant.

8. A detergent composition for clothing, comprising the detergent composition according to claim 1.

9. A method of applying an antiredeposition ability to a detergent composition, the method including incorporating, into the detergent composition, a polyaspartic acid alkali metal salt having a polydispersity, represented by the ratio (Mw/Mn) of the weight-average molecular weight (Mw) to the number-average molecular weight (Mn), of 1.4 to 1.7 and being selected from the group consisting of lithium polyaspartate, potassium polyaspartate, and sodium polyaspartate,
 the polyaspartic acid alkali metal salt having a weight-average molecular weight (Mw) of from 21,400 to 120,000.

10. The method according to claim 9, wherein the detergent composition has a pH from 6 to less than 9.

11. The method according to claim 9, wherein the polyaspartic acid alkali metal salt is sodium polyaspartate, potassium polyaspartate, or both of sodium polyaspartate and potassium polyaspartate.

12. The method according to claim 9, wherein the polyaspartic acid alkali metal salt has a polydispersity of from 1.4 to 1.69.

13. The method according to claim 9, the polyaspartic acid alkali metal salt has a polydispersity of from 1.4 to 1.65.

14. The method according to claim 9, wherein the polyaspartic acid alkali metal salt has a weight-average molecular weight (Mw) of from 22,300 to 120000.

15. The method according to claim 9, wherein the polyaspartic acid alkali metal salt has a weight-average molecular weight (Mw) of from 22,300 to 80000.

16. The method according to claim 9, wherein the polyaspartic acid alkali metal salt has a number-average molecular weight (Mn) of from 12,000 to 80000.

17. The method according to claim 9, wherein the polyaspartic acid alkali metal salt has a number-average molecular weight (Mn) of from 13,000 to 50000.

18. The method according to claim 9, wherein the polyaspartic acid alkali metal salt is a solid phase polymerization polyaspartic acid alkali metal salt.

19. The method according to claim 9, wherein the detergent composition is a detergent composition for clothing, the detergent composition having a pH from 6 to less than 9.

20. The method according to claim 9, wherein the detergent composition further includes a surfactant.

* * * * *